(12) United States Patent
Xia et al.

(10) Patent No.: US 9,503,391 B2
(45) Date of Patent: Nov. 22, 2016

(54) METHOD AND SYSTEM FOR NETWORK FUNCTION PLACEMENT

(71) Applicant: Telefonaktiebolaget L M Ericsson (publ), Stockholm (SE)

(72) Inventors: Ming Xia, San Jose, CA (US); Meral Shirazipour, San Jose, CA (US); Ying Zhang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 147 days.

(21) Appl. No.: 14/328,471

(22) Filed: Jul. 10, 2014

(65) Prior Publication Data

US 2015/0295849 A1 Oct. 15, 2015

Related U.S. Application Data

(60) Provisional application No. 61/978,448, filed on Apr. 11, 2014.

(51) Int. Cl.
*H04L 12/28* (2006.01)
*H04L 12/911* (2013.01)
*G06F 9/50* (2006.01)
*H04L 12/24* (2006.01)

(52) U.S. Cl.
CPC .............. *H04L 47/782* (2013.01); *G06F 9/50* (2013.01); *H04L 41/0806* (2013.01); *H04L 41/0896* (2013.01); *H04L 41/5041* (2013.01); *H04L 47/748* (2013.01); *H04L 47/822* (2013.01)

(58) Field of Classification Search
CPC .................. H04L 41/00; H04L 41/50; H04L 2012/5678; H04L 2012/568; H04L 29/08153; H04L 29/08234; H04L 29/08243; G06F 3/0662–3/0667

USPC .......................... 370/237, 255, 389, 254, 400
See application file for complete search history.

(56) References Cited

U.S. PATENT DOCUMENTS

| | | | |
|---|---|---|---|
| 2004/0264500 A1* | 12/2004 | Bansal et al. | 370/468 |
| 2010/0260500 A1 | 10/2010 | Ji et al. | |
| 2011/0131431 A1* | 6/2011 | Akers et al. | 713/320 |
| 2012/0099863 A1 | 4/2012 | Xu et al. | |
| 2013/0014101 A1 | 1/2013 | Ballani et al. | |

(Continued)

OTHER PUBLICATIONS

J. Postel, "User Datagram Protocol," Aug. 28, 1980, 3 pages, RFC: 768.

(Continued)

*Primary Examiner* — Andrew Chriss
*Assistant Examiner* — Kenan Cehic
(74) *Attorney, Agent, or Firm* — NDWE LLP

(57) ABSTRACT

A method implemented for network function placement is disclosed. The method optimizes network function placement for each traffic flow, to minimize the overall inter-pod traffic volume. For each traffic flow going through a data center, the method initiates a pod list. The network functions of the traffic flow is sorted in a descending order by resource demanded. Then one network function is selected one at a time according to the descending order. For each network function, the pods in the pod list is sorted in an ascending order by resource available in each pod. The method selects a first pod for the network function when possible. When no pod in the pod list has enough resource for the network function, the method adds a pod with the most available resource from a pod pool to the pod list, and selects the added pod for the network function.

18 Claims, 8 Drawing Sheets

(56) References Cited

U.S. PATENT DOCUMENTS

| | | | |
|---|---|---|---|
| 2013/0272305 | A1 | 10/2013 | Lefebvre et al. |
| 2013/0287397 | A1 | 10/2013 | Frankel et al. |
| 2014/0064283 | A1 | 3/2014 | Balus et al. |
| 2014/0099119 | A1* | 4/2014 | Wei et al. ............. 398/79 |
| 2014/0119728 | A1 | 5/2014 | Zhang et al. |
| 2014/0201375 | A1* | 7/2014 | Beereddy et al. ....... 709/226 |
| 2015/0098700 | A1 | 4/2015 | Zhu et al. |
| 2015/0113144 | A1* | 4/2015 | Bauer et al. ........... 709/226 |
| 2015/0181317 | A1 | 6/2015 | Yin et al. |
| 2015/0207586 | A1 | 7/2015 | Xia et al. |
| 2015/0365462 | A1* | 12/2015 | Jenkins et al. .......... 709/217 |

OTHER PUBLICATIONS

"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.

D. Awduche, et al., "RSVP-TE: Extensions to RSVP for LSP Tunnels," Dec. 2001, 61 pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffsery Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffSery Service Classes," Aug. 2006, 57 pages, Network Working Group, Request for Comments: 4594, The Internet Society.
K. Kompella, et al., "Virtual Private LAN Service (VPLS) Using BGP for AutoDiscovery and Signaling," Jan. 2007, 28 pages, Network Working Group, Request for Comments: 4761, The IETF Trust.
M. Lasserre, et al., "Virtual Private Lan Service (VPLS) Using Label Distribution Protocol (LDP) Signaling," Jan. 2007, 31 pages, Network Working Group, Request for Comments: 4762, The IETF Trust.
L. Andersson, et al., "LDP Specification," Oct. 2007, 135 pages, Network Working Group, Request for Comments: 5036, The IETF Trust.
R. Coltun, et al., "OSPF for IPv6," Jul. 2008, 94 pages, Network Working Group, Request for Comments: 5340, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.

(56) References Cited

OTHER PUBLICATIONS

F. Baker, et al., A Differentiated Services Code Point (DSCP) for Capacity-.

"Network Functions Virtualization (NFV)—Network Operator Perspectives on Industry Progress", White Paper [Online]: http://portal.etsi.org/NFV/NFV_White_Paper2.pdf, Oct. 2013, 16 pages.

"Network Functions Virtualization (NFV) Architectural Framework", ETSI GS NFV 002 V1.1.1, Oct. 2013, [Online] available: http://www.etsi.org/deliver/etsi_gs/NFV/001_099/002/01.01.01_60/gs_NFV002v010101p.pdf, 21 pages.

"Network Functions Virtualization, An Introduction, Benefits, Enablers, Challenges & Call for Action", White Paper [Online] http://portal.etsi.org/NFV/NFV_White_Paper.pdf, Oct. 2012, 16 pages.

"OpenFlow Specification", OpenFlow Switch Specification 1.4.0, Oct. 15, 2013, 205 pages.

"Wavelength Selective Switches for ROADM Applications", http://www.finisar.com/sites/default/files/pdf/VVSS%20ROADM%20Product%20Guide%209_2011%20V7_1.pdf, 2011, 4 pages.

"WDM: ITUT G694.1 http://www.itu.int/rec/T-REC-G.694.1", Feb. 2012, 16 pages.

Beliveau, Ludovic, et al., "Methods and Network Nodes for Traffic Steering Based on Per-Flow Policies", U.S. Appl. No. 13/768,956, filed Feb. 15, 2013, 32 pages.

Bitar, N., et al., "Technologies and protocols for data center and cloud networking", IEEE Communications Magazine, vol. 51, No. 9, pp. 24-31, Sep. 2013.

Chen, K., et al., "OSA: An optical switching architecture for data center networks with unprecedented flexibility", proc. USENIX/NSDI, San Jose, CA, Apr. 2012, 14 pages.

Farrington, N., et al., "Helios: a hybrid electrical/optical switch architecture for modular data centers", proc. ACM SIGCOMM 2010, pp. 339-350.

Gringeri, S., et al., "Flexible architectures for optical transport nodes and networks", IEEE Communications Magazine, vol. 48, No. 7, pp. 40-50, Jul. 2010.

Joseph, D., et al., "A policy-aware switching layer for data centers", proc. ACM SIGCOMM, pp. 51-62, 2008.

Mannie, E., "Generalized Multi-Protocol Label Switching (GMPLS) architecture", RFC 3945, IETF, Oct. 2004, 69 pages.

Qazi, Z., et al., "SIMPLE-fying Middlebox Policy Enforcement Using SDN", Proc. ACM SIGCOMM, Hong Kong, Aug. 2013, 12 pages.

Sekar, V., et al., "Design and implementation of a consolidated middlebox architecture", proc. Symposium on Networked Systems Design and Implementation, 2012, 14 pages.

Sekar, V., et al., "The middlebox manifesto: enabling innovation in middlebox deployment", proc. 10th ACM Workshop on Hot Topics in Networks, 2011, 6 pages.

Sherry, J., et al., "Making middleboxes someone else's problem: network processing as a cloud service", proc. ACM SIGCOMM, pp. 13-24, 2012.

Wang, G., et al., "c-Through: Part-time Optics in Data Centers", proc. ACM Sigcomm 2010, pp. 327-338.

Xia, M., et al., "Green provisioning for optical WDM networks", IEEE Journal of Selected Topics in Quantum Electronics (JSTQE), vol. 17, No. 2, pp. 437-445, Mar.-Apr. 2011.

Xia, Ming, et al., "SDN and Optical Flow Steering for Network Function Virtualization", Mar. 2014, 2 pages.

Yao, C., "What is wavelength selective switch-WSS?", Mar. 14, 2011, [Online] available: http://www.fiberoptics4sale.com/wordpress/what-is-wavelength-selective-switchwss/, 8 pages.

Zhang, Ying, et al., "1) StEERING: A Software-Defined Networking for Inline Service Chaining", INCP 2013, Goettingen, Germany, Oct. 2013, 10 pages.

Marcus Scholler et al., "Resilient deployment of virtual network functions", 2013 5th International Congress on Ultra Modern Telecommunications and Control Systems and Workshops, Sep. 1, 2013, pp. 208-214.

"Proceedings of NSDI '12: 9th USENIX Symposium on Networked Systems Design and Implementation," Apr. 25-27, 2012, pp. 1-437, San Jose, CA, USENIX Association.

Jordi Perello et al., "All-Optical Packet/Circuit Switching-Based Data Center Network for Enhanced Scalability, Latency, and Throughput," Nov./Dec. 2013, pp. 14-22, IEEE Network.

L. Schares et al., "A reconfigureable interconnect fabric with optical circuit switch and software optimizer for stream aomputing systems," 2009, pp. 1-3, Optical Society of America, IEEE.

\* cited by examiner

| |
|---|
| Algorithm 1 |
| Given<br>  Pod list *PodList*<br>  Flow list *FlowList*<br>  Network function list *NFList$_f$* for each flow *f* in *FlowList* |
| 1 For each flow *f*,<br>2   Initiate an empty pod list *PodList$_f$*.<br>    Sort the NFs needed by *f* in a descending order by resource demand |
| 3   For each unprocessed NF *n* of *f*<br>    Set *flag*=false<br>    Sort *PodList$_f$* in an ascending order by available resources and select the first pod *p*<br>      If *p* has enough resources for *n*, provision *n* by *p* and set *flag*=true<br>      Else go to the next pod *p* in *PodList$_f$*.<br>    If *flag*=false, add the most-available-resource pod $p_m$ of *PodList* to *PodList$_f$*. Provision *n* by $p_m$. |
| 4 a In *PodList*, select pod $p_a$ with the least resources consumed by its newly-provisioned NFs, and pod $p_b$ with the most available resources.<br>  b Move all the newly-provisioned NFs of $p_a$ to $p_b$ if resources allow and continue on 4a, otherwise end the algorithm. |

 302

 304

 306

 308

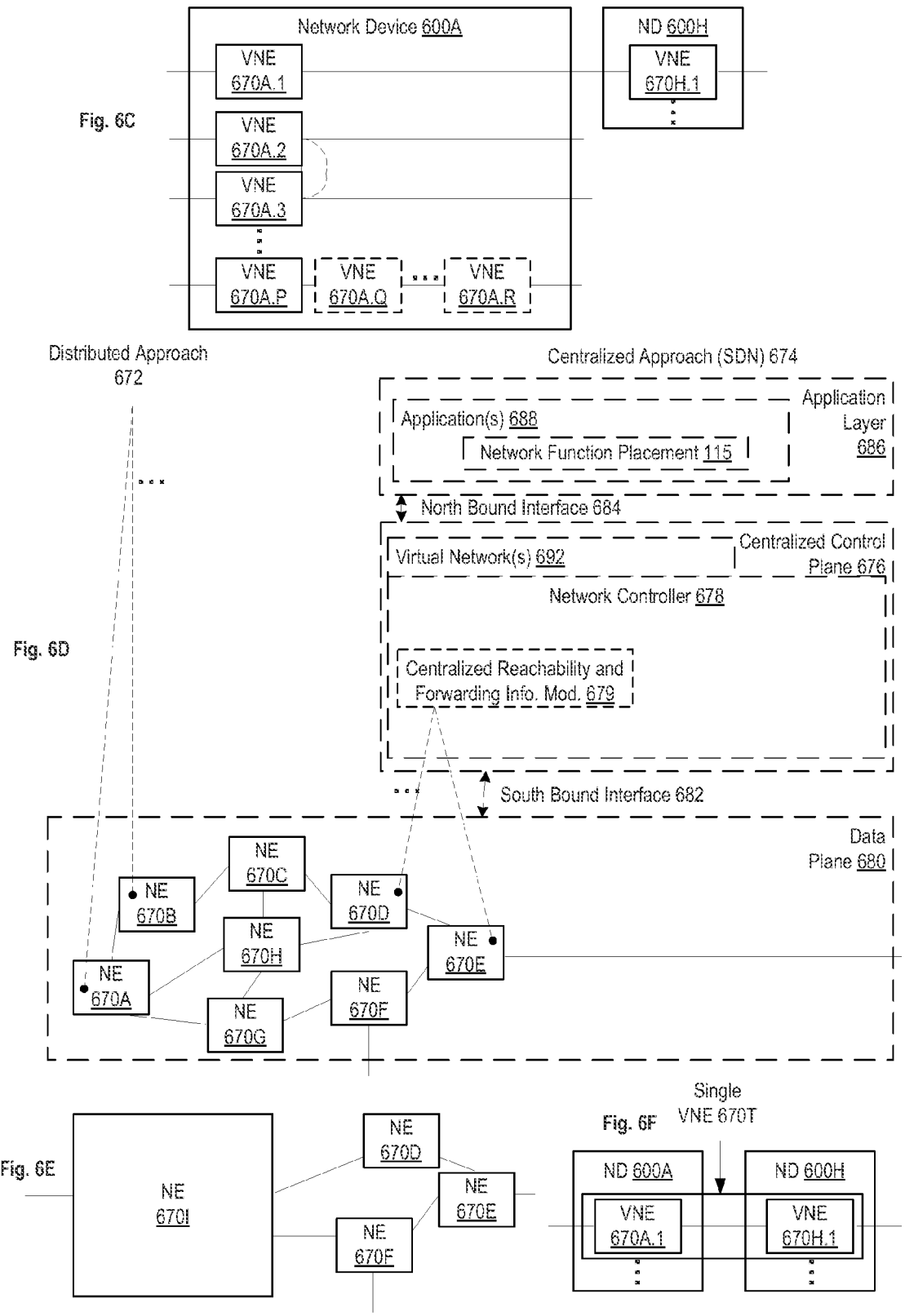

METHOD AND SYSTEM FOR NETWORK FUNCTION PLACEMENT

CROSS-REFERENCE TO RELATED APPLICATIONS

This application claims priority to U.S. Provisional Patent Application No. 61/978,448, entitled "Network Function Placement Method for NFV Chaining in Optical/Packet Hybrid Data Centers," filed on Apr. 11, 2014, which is incorporated by reference herein in its entirety.

FIELD OF INVENTION

The embodiments of the invention are related to the field of networking. More specifically, the embodiments of the invention relate to a method and system for network function place of a network.

BACKGROUND

The recent advances in software engineering and high-performance commodity servers facilitate virtualization of network function (NFs). NFs traditionally delivered on proprietary and application-specific equipment now can be realized in software running on generic server hardware (e.g., commercial off-the-shelf (COTS) servers). The technology, coined as network function virtualization (NFV), is gaining increasing popularity with network operators.

NFV may be implemented at various parts of a network, such as serving gateway (S-GW), packet data network gateway (P-GW), serving GPRS (general packet radio service) support node (SGSN), gateway GPRS support node (GGSN), broadband remote access server (BRAS), and provider edge (PE) routers. NFV can be also implemented to support various services or appliances such as deep packet inspection (DPI), firewall (FW), virus scanning (VS), Intrusion Detection and Prevention (IDP), and network address translation (NAT). Because NFV can be flexibly instantiated and torn down in an operator's cloud/data center (DC) when and where needed, and it provides high resource utilization and short service development cycle, network operators can achieve great capital expenditure (Capex) and operational expenditure (Opex) savings.

When a traffic flow arrives at an operator's DC hosting NFV, it will be steered through a number of virtual NFs in an order based on the operator's provisioning policy and service level agreement (SLA). This process is generally referred to as NF chaining, which requires dynamic configuration of the DC network. Due to the growing traffic volume of traffic flows, optical switching technologies have been introduced to enable efficient intra-DC steering for flows aggregation. Traffic flows also need to be processed in electric form utilizing packet switching technologies. Thus, a traffic flow often switches between optical and packet switching several times as it routes through one or more DCs. Yet, optical/electrical/optical (O/E/O) conversions are expensive, and it is desirable to minimize O/E/O conversions in implementing NFV. In addition, even for implementation of NFV without the need of O/E/O, some network function placement is more efficient than the others when measured by certain criteria, and it is desirable to optimize network function placement in providing NF chaining.

SUMMARY

A method implemented in an electronic device coupled to a network for network function placement is disclosed. Traffic in the network is routed as a set of traffic flows, each traffic flow goes through a chain of network functions, and each network function is to be performed by software running on a server. Each server resides at a pod, which is a hardware unit coupled to the network. The method is performed for traffic flows. For each traffic flow, a pod list is initiated, where the pod list contains no pod initially. The network functions within a corresponding chain of the traffic flow is sorted in a descending order by resource demanded, where the resource demanded by each network function is predetermined. Then one network function of the traffic flow is selected one at a time according to the descending order. For each network function of the traffic flow, the pods in the pod list is sorted in an ascending order by resource available in each pod if the pod list is not empty. Then the method selects a first pod within the pod list for the network function to reside when possible, where the first pod has enough resource available for the network function to reside, and where the selecting follows the ascending order of the pods in the pod list. When no pod in the pod list has enough resource available for the network function to reside, the method adds a pod from a pod pool to the pod list, where the added pod is the pod outside of the pod list with the most available resource in the pod pool, and the method selects the added pod for the network function to reside.

An electronic device to be coupled to a network for network function placement is disclosed. Traffic in the network is routed as a set of traffic flows, each traffic flow goes through a chain of network functions, and each network function is to be performed by software running on a server. Each server resides at a pod, which is a hardware unit coupled to the network. The electronic device contains a processor and non-transitory machine-readable storage medium containing instructions which when executed by the processor cause the process to perform the following for each traffic flow. The processor initiates a pod list, where the pod list contains no pod initially. The processor then sorts network functions within a corresponding chain of the traffic flow in a descending order by resource demanded, where the resource demanded by each network function is predetermined. The processor then selects one network function of the traffic at a time according to the descending order. Then for each network function of the traffic flow, the processor sorts pods in the pod list in an ascending order by resource by resource available in each pod if the pod list is not empty. Then the processor selects a first pod within the pod list for the network function to reside when possible, where the first pod has enough resource available for the network function to reside and the selecting follows the ascending order of the pods in the pod list. When no pod in the pod list has enough resource available for the network function to reside, the processor adds a pod from a pod pool of the network to the pod list, where the added pod is the pod outside of the pod list with the most available resource in the pod pool, and selects the added pod for the network function to reside.

A non-transitory machine-readable storage medium having instructions stored therein for network function placement is disclosed. The non-transitory machine-readable storage medium, when executed by a processor, causes the processor to perform operations implemented at an electronic device coupled to a network. Traffic in the network is routed as a set of traffic flows, each traffic flow goes through a chain of network functions, and each network function is to be performed by software running on a server. Each server resides at a pod, which is a hardware unit coupled to the network. The operations are performed for each traffic flow. The operations include initiating a pod list, where the pod list contains no pod initially. The network functions within a corresponding chain of the traffic flow is then sorted in a descending order by resource demanded, where the resource demanded by each network function is predetermined. Then one network function of the traffic flow is selected one at a time according to the descending order. For each network function of the traffic flow, the pods in the pod list is sorted in an ascending order by resource available in each pod if the pod list is not empty. Then the operations select a first pod within the pod list for the network function to reside when possible, where the first pod has enough resource available for the network function to reside, and where the selecting follows the ascending order of the pods in the pod list. When no pod in the pod list has enough resource available for the network function to reside, the operations add a pod from a pod pool to the pod list, where the added pod is the pod outside of the pod list with the most available resource in the pod pool, and the operations select the added pod for the network function to reside Embodiments of the invention utilize algorithms to improve network function placement so that traffic flows are routed more efficiently through a network. Through embodiments of the invention, inter-pod traffic of a cloud/data center may be greatly reduced and pods are utilized more efficiently.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 3 is a pseudo code illustrating the heuristic algorithm for network function according to one embodiment of the invention.

FIG. 6C illustrates various exemplary ways in which virtual network elements (VNEs) may be coupled according to some embodiments of the invention.

FIG. 6D illustrates a network with a single network element (NE) on each of the NDs of FIG. 6A, and within this straight forward approach contrasts a traditional distributed approach (commonly used by traditional routers) with a centralized approach for maintaining reachability and forwarding information (also called network control), according to some embodiments of the invention.

FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention.

DETAILED DESCRIPTION

Figure 1:
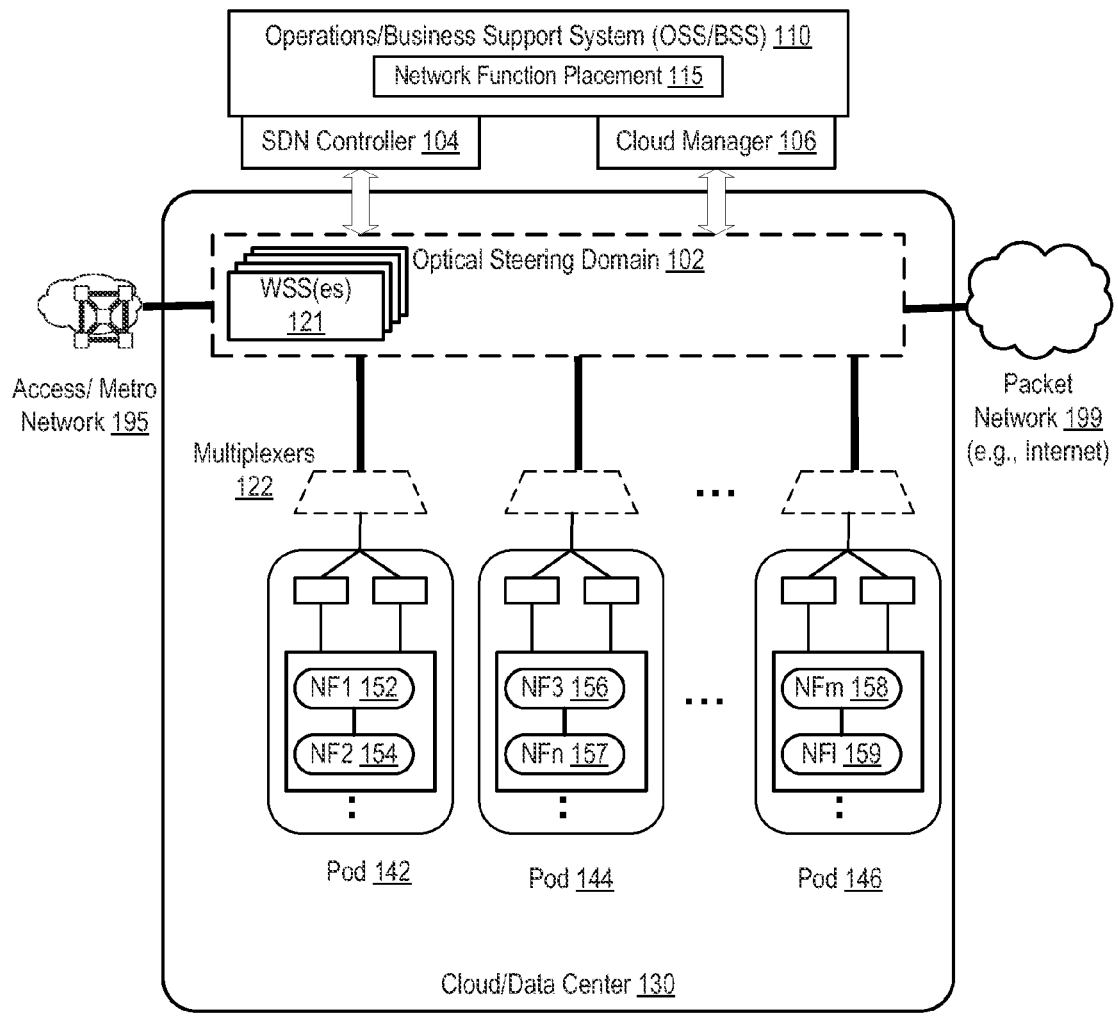
FIG. 1 illustrate a cloud/data center (DC) according to one embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/ or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Cloud/Data Center (DC) Configuration

FIG. 1 illustrate a cloud/data center (DC) according to one embodiment of the invention. Cloud/data center 130 receives traffic flows from access or metro network 195, and the traffic flows are routed to packet network 199 (e.g., Internet). Cloud/data center 130 may be managed by at least one of software-defined network (SDN) controller 104 and cloud manager 106. SDN controller 104 and cloud manager 106 may be managed by operation/business support system (OSS/BSS) 110. OSS/BSS 110 may be used to support end-to-end services through traffic flows routed passing cloud/data center 130. OSS/BSS 110 contains network function placement module 115, which is a module configured to place network functions within cloud/data center 130 as discussed in more detail herein. Note that an OSS/BSS is often referred to as orchestrator of a cloud/data center.

Cloud/data center 130 contains multiple pods for network functions. A pod is a hardware unit, which is an electronic device. A pod contains one or more computing servers, each containing software performing one or more network functions that traffic flows go through in routing in cloud/data center 130. A pod is a group of resources of cloud/data center 130. The pods often share the same top-of-rack (ToR) or end-of-row (EoR) switches for example. In one embodiment, a pod is a modular, self-contained container including one or more servers for computing, input/output interfaces for networking, and optionally cooling for maintaining suitable temperature for operations. Pod 142 contains network functions (NFs) NF1 and NF2 (e.g., NF1 and NF2 resides at one or more servers of pod 142) at references 152 and 154 respectively, while pod 144 contains NF3 and NFn at references 156 and 157, and pod 146 contains NFm and NF1 at references 158 and 159 respectively.

At cloud/data center 130, traffic flows may optionally go through an optical steering domain 102. Optical steering domain 102 contains optical switching devices to route traffic in the optical domain. An optical switching device may be a variety of devices such as a wavelength switch (WSS) or an optical add drop modules (OADM). WSS(es) 121 is an example of such optical switching device. Optical steering domain 102 typically serves as the backbone of cloud/data center 120, which is coupled to multiple pods. After a traffic flow goes through optical steering domain 102, it goes through one of the multiplexers 122 and reaches a pod. The pod converts the wavelength to packets and steers the traffic flow to the server where the needed network functions are running. After the traffic flow has traversed all the needed network functions in the pod, the traffic flow will be converted back to wavelength. The O/E/O conversion is costly in both operations and capital investment, and it is desirable to avoid the number of O/E/O conversions when traffic flows of cloud/data center 130 go through optical steering domain 102 and pods 142-146.

In other words, it is desirable to pack as many as possible network functions of the network function chain of a traffic flow in the same pods. For all the traffic flows and all the pods of cloud/data center 130, it is desirable to place the network functions so that the aggregated O/E/O conversions are minimized Packing as many as possible network functions of the network function chains can also be beneficial for a cloud/data center without any optical steering domain. In that case, pods may be located at different physical locations and traffic flows going through different pods for network functions may consume bandwidth and cause latency that are significant more than traffic flows going through same pods or smaller numbers of different pods. In addition, a pod is just an example of hardware implementing network functions, and the hardware can be a rack of computing servers too. The packing of network functions will be beneficial generally as it reduces the need of coordination of the hardware coordinating with other hardware.

The optimization of network function placement proposed in embodiments of the inventions may be utilized at a variety of cloud/data centers where network functions need to be distributed to different modules/locations.

Exemplary Problems to be Resolved

Figure 2A:
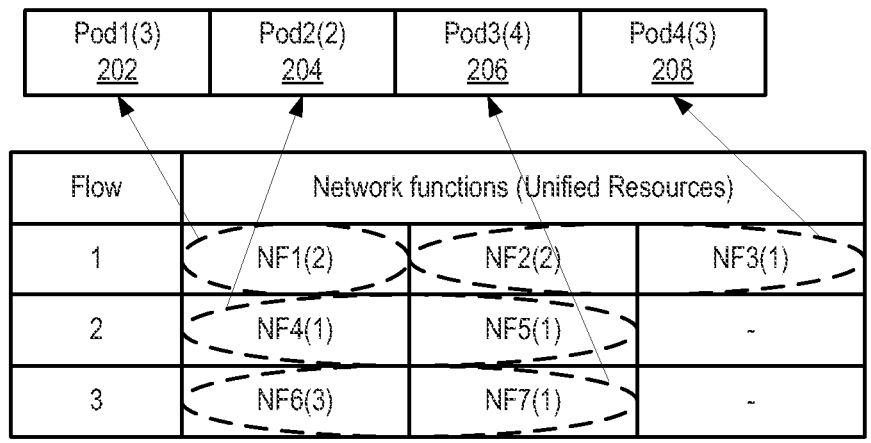
FIGS. 2A-B illustrate an example of two network function placements for an identical set of network function chains.
Figure 2B:
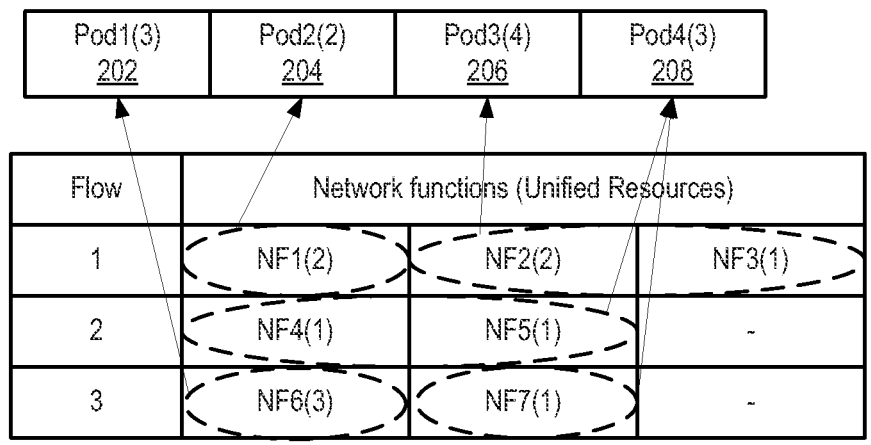

FIGS. 2A-B illustrate an example of two network function placements for an identical set of network function chains. In both figures, the cloud/data center contains four pods 202-208. Different pods may accommodate different number of network functions as they have different amounts of resources. The amount of resources are quantified to numerical number for both the pods and the network function chains. The amount of resources may take a variety of forms. For example, the amount of resources may be bandwidth consumed by a network function, computing power demanded (e.g., CPU percentage, processing duration) by a network function, or data storage space/memory space demanded by a network function. In this example, the amount of resources are abstracted to as unified resources (i.e., resource units). The number following each pod indicates the unified resource it contains (i.e., available resources), thus pods 1-4 contain 3, 2, 4, and 3 available resource units respectively.

In FIG. 2A, flow one contains a network function chain of NF1-NF3, which require resource units of 2, 2, and 1 respectively as shown by the numbers following NF1-NF3. Similarly, flow two contains a network function chain of N4-F5, and flow three contain a network function chain of N6-N7, where the required resource units are indicated following the respective network functions. FIG. 2B contains the same pods, flows, and network functions, and the difference between the two figures are the network function places in the pods.

The network function placement are similar in both figures for flows one and two, where flow one goes through two pods respectively (pod 1 at 202 and pod 4 at 208 in FIG. 2A, and pod 2 at 204 and pod 3 at 206 in FIG. 2B) and flow two goes through one pod respectively (pod 2 at 204 in FIG. 2A and pod 4 at 208 in FIG. 2B). Yet flow three have different network function placements in the two figures. In FIG. 2A, the two network functions of flow three reside within pod 3 at 206; in FIG. 2B, the two network functions of flow three reside at pod 1 at 202 and pod 4 at 208 respectively. Thus, the network placement in FIG. 2A is better than the network placement in FIG. 2B as the latter has less distributed network placement in pods. The objective of embodiments of this invention to find an efficient network placement when all traffic flows are considered for a given cloud/data center.

Problem Formulation and an Exemplary Algorithm

The problem of network placement may be summarized as the following: Each network function chain (of each traffic flow) has a set of network functions to be placed in a number of pods (or other hardware). The network functions of the same chain placed in the same pod form a placement group. The network functions of the same chain is partitioned into one or more placement groups. One of the optimization objective is to minimize the total number of placement groups for all the network function chains, considering resource constrains of the pods and resource required of the network functions.

A placement group of a network function chain corresponds to a pod the network function chain needs to go through. A network function's resource demand is always less than the full resources of a pod, so that a single network function does not need to be split to more than one pod. It is assumed that the total number of pods for network function placement is sufficient to accommodate all the requests. One drawback of minimizing network function split among the pods is that it may limit the freedom of the cloud manager or SDN controller to choose a specific pod for a network function chain (e.g., for security reason). Such cases can be addressed by adding this requirement as an extra constraint to the problem, or simply having the operator manually assign the network function placement for the network function chain in question.

The optimization problem may be formulated as an integer linear programming (ILP) problem. An ILP problem is a subset of linear programming problem, where the entries of a solution vector are integer. More specifically, the optimization problem may be formulated as a binary integer programming (BIP) problem, where the entries of the solution vector are binary one or zero, since a network function may be either in a pod or not, there is no third option in the solution. The BIP problem may have the following inputs:

F Total number of flows.
N Total number of pods for placement.
M Total number of NF types.
$r_{fm}^{bw}$ Bandwidth (resource) requirement of NF m needed by flow f. 0 means flow f does not need NF m. $1 \le f \le F$, $1 \le m \le M$.
$r_{fm}^{cpu}$ (resource) requirement of NF m needed by flow f, $1 \le f \le F$, $1 \le m \le M$.
$p_n^{bw}$ Bandwidth resources of pod n, $1 \le n \le N$.
$P_n^{cpu}$ resources of pod n, $1 \le n \le N$.

The variables are:
$x_{fmn}$ Binary variable. 1 if NF m needed by flow f is assigned to pod n, 0 otherwise.
$s_{fn}$ Binary variable. 1 if flow f uses pod n, 0 otherwise. i.e., $$s_{fn} = \begin{cases} 1, & \text{if } \Sigma_m x_{fmn} \ge 1 \\ 0, & \text{otherwise} \end{cases}.$$

The constraints are:

$$\Sigma_n x_{fmn} = 1 \tag{1}$$

$$\Sigma_f \Sigma_m x_{fmn} \cdot r_{fm}^{bw} \le p_n^{bw} \tag{2}$$

$$\Sigma_f \Sigma_m x_{fmn} \cdot r_{fm}^{cpu} \le p_n^{cpu} \tag{3}$$

The objective of the optimization is:

$$\min \Sigma_f \Sigma_n s_{fn} \tag{4}$$

Equation (1) indicates that each network function for a traffic flow must be assigned to exactly one pod. Equations (2) and (3) ensure the resource constraints are met for each pod. Note for this embodiment, the resources are bandwidth and computing power consumed by the network functions respectively as illustrated in equations (2) and (3), but other constraints (such as data storage and memory consumed by the network functions) may be added to solve the optimization. In addition, any constraint singly or in combination with one or more other constraints may be used to solve the optimization problem. In the objective function, $\Sigma_n s_{fn}$ is the number of placement groups of flow f. The optimization target is to minimize this value for all the flows. Note that the expression of variable $s_{fn}$ can be further linearized in equations (5) and (6) below, where A is a constant larger than M.

$$s_{fn} \times A \ge \Sigma_m x_{fmn} \tag{5}$$

$$\Sigma_m x_{fmn} \times A \ge s_{fn} \tag{6}$$

The ILP-based solution does not scale with the size of the input (e.g., F, M, N), therefore a heuristic algorithm is needed. FIG. 3 is a pseudo code illustrating the heuristic algorithm for network function according to one embodiment of the invention. The heuristic algorithm may be implemented on a network function placement module 115 as illustrated in FIG. 1. The high level idea is, for each flow f, selecting the pod with the most available resources such that more network functions of this flow can be placed in the pod. The pod is then added into a pod list for the flow. The network function placement for flow f follows a best-fit strategy, i.e., each time the algorithm selects the unassigned network function with the highest resource demand, and assigns it to the pod with the least but sufficient resources in the pod list. If no such pod can be found, select the pod with the most resources from the list of available pods, and add to the pod list for the flow and repeat the network function placement. Assuming that there are sufficient pods, no flow will be rejected. After all network functions are assigned, the algorithm conducts pod consolidation to minimize the number of pods.

Referring to FIG. 3, the heuristic algorithm 300 takes input at reference 302, including (1) a pod list of available pods of a cloud/data center, PodList, (2) a flow list of flows go through the cloud/data center, FlowList, and (3) network function list for each flow f in FlowList, $NFList_f$.

The optimization process is then run for each flow f. At reference 304, the network function placement module initiates an empty pod list $PodList_f$ for the flow. Then it sorts the network functions needed by flow f in a descending order by resource demanded.

At reference 306, for each unprocessed network function n of flow f, a flag is set to false. Then the pod list for the flow $PodList_f$ is sorted in an ascending order by available resources, and the network function placement module select the first pod p, which is the one containing the least available resource. If pod p has enough resources for network function n, network function placement module selects pod p for network function n and set the flag to true indicating that n has been assigned. If pod p does not have enough resources for network function n, the network function placement module goes to the next pod p in the ascending ordered $PodList_f$ to select resource for n. If none of the pod in has enough resources for n, the flag remains at false after the network function placement module goes through the ascending ordered $PodList_f$. The network function placement module then adds the pod with the most available resource, $p_m$ of PodList to $PodList_f$. Note that $PodList_f$ starts with an empty list, so $PodList_f$ grows in size with each addition, and once a pod is moved from PodList to $PodList_f$, it is available for flow f to select resource. The network function placement module selects pod $p_m$ for network function n. The steps in reference 306 reiterate for each network function n of flow f until all the network functions of flow f are processed.

After all the network functions of flow f are processed, the network function placement module conducts pod consolidation to minimize the number of pods at reference 308. In the pod list $PodList_f$ for the flow, the network function placement module selects the pod $p_a$ with the least resources consumed by its newly assigned network functions, and the pod $p_b$ with the most available resources. Then the network function placement module reassigns all the newly provisioned network functions of $p_a$ to $p_b$ if resources on $p_b$ allows. The consolidation of pods continues at reference 308 until no such pair of pods can be selected and consolidated.

Flow Diagrams for Network Function Placement

Figure 4:
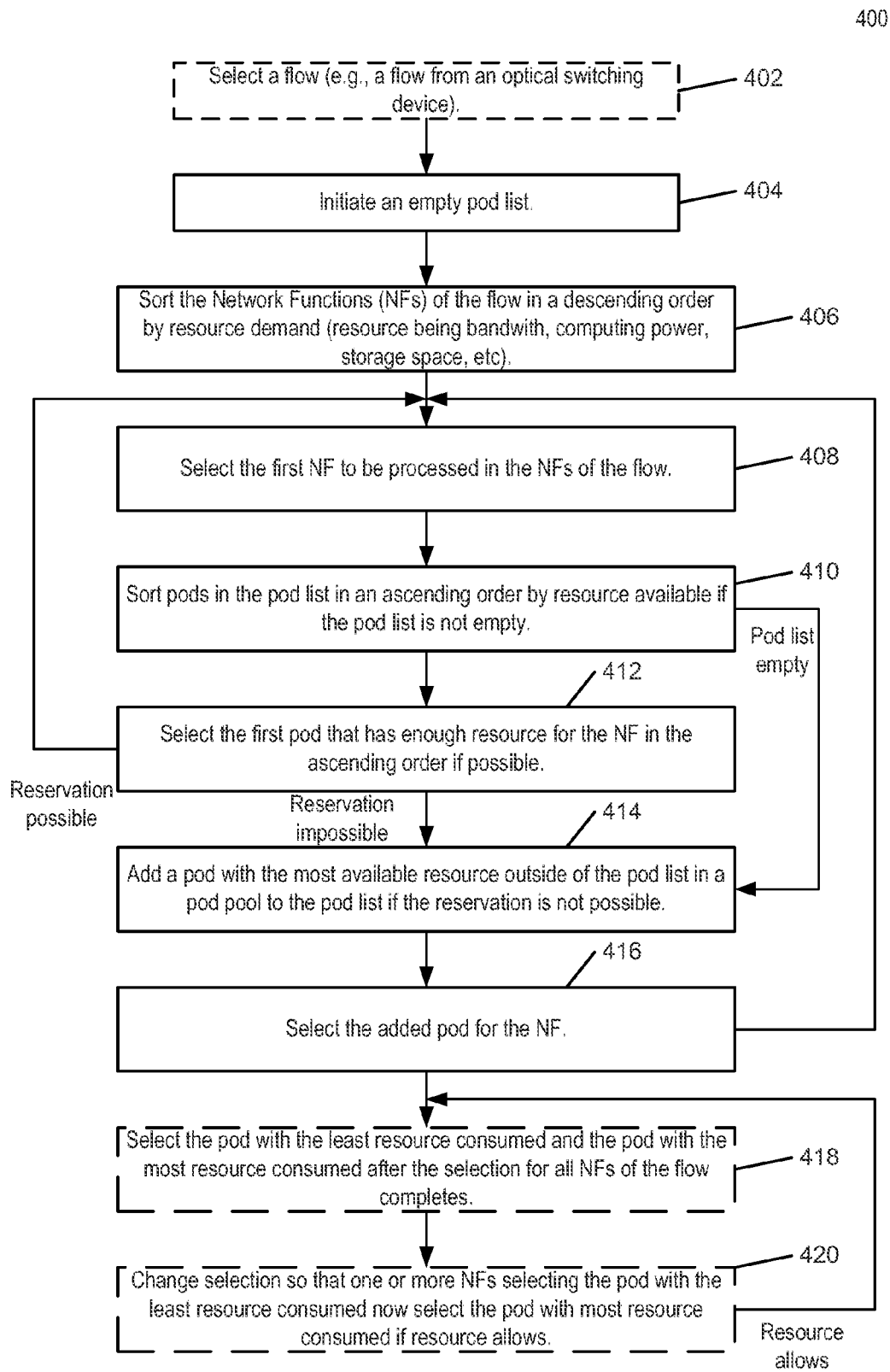
FIG. 4 is a flow diagram illustrating a method for network function placement according to one embodiment of the invention.

FIG. 4 is a flow diagram illustrating a method for network function placement according to one embodiment of the invention. Method 400 may be implemented in an electronic device containing a network function placement module as discussed herein below with regard to FIG. 5. Method 400 operates in a cloud/data center where traffic flows go through multiple network functions (network function chaining) The network functions are to be performed by servers of the cloud/data center, and each server resides at a hardware unit referred to as a pod. The cloud/data center may contain one or more optical steering domain in which traffic flows are routed through optical switching devices such as WSSes and OADMs. Thus, the cloud/data center may contain a network, the network can be a packet network or a combination of a packet network and an optical network.

The method operates on each traffic flow of the network. At reference 402, the network function placement module optionally select a traffic flow. The traffic flow may come from a packet network or an optical network depending on implementation. The traffic flow selection may also be performed by a different module. At reference 404, the network function placement module initiates an empty pod list for the traffic flow. Then the network function placement module sorts the network functions of the flow in a descending order by resource demanded at reference 406. The resource demanded are quantified in a number of resource units in one embodiment. The resource demanded may be a bandwidth consumed by the network function, computing power demanded (e.g., CPU percentage, processing duration) by a network function, or data storage space/memory space demanded by a network function.

At reference 408, the network function placement module selects the first not-processed network function of the descending ordered network function. Then the network function placement module sorts pods in the pod list for the traffic flow at reference 410 assuming more than one pod exists (the step is skipped when the pod list is empty or only contains one pod). If the pod list is empty, the flow goes to reference 414 directly. The pods are sorted in an ascending order by resource available. Then the network function placement module selects the first pod that has enough resource for the network function at reference 412. Since the pods are sorted in the ascending order by resource available, the network function placement module goes to the next pod in the pod list for the flow if the one pod does not have enough resource until it finds one with enough resource, in which case it goes back to reference 408 to select the next not-processed network function for selection.

If the network function placement module cannot find a pod with enough available resource for the network function, the flow goes to reference 414, where a pod with the most available resource outside of the pod list for the traffic flow and in a pod pool is added to the pod list. The pod pool may include all the pods coupled to the network in one embodiment. In another embodiment, only a subset of the pods coupled to the network is included in the pod pool thus available for the selection. For example, the selection may be limited to pods at certain physical location or ones maintained by some network domain. That is, other pods considered not suitable for hosting the network function is excluded. At reference 416, the network function placement module selects the added pod for the network function. The flow then goes back to reference 408 again to select the next not-processed network function for selection. Steps 408-416 repeat a number of iterations until all the descending ordered network functions complete selection of pods.

Then optionally the network function placement module may consolidate pod selection at references 418 and 420. At reference 418, the network function placement module selects the pod with the least resource consumed after the selection and the other with the most resource consumed after the selection. Then at reference 420, the network function placement module changes selection of one or more network functions from the pod with the least resource consumed to the pod with the most resource consumed, if the pod with the most resource consumed having sufficient resource for the one or more network functions to reside. The pod with the least resource consumed will no longer be selected for the traffic flow, thus the number of pods selected for the network function is reduced by one. The flow goes back to reference 418 if a prior iteration of consolidation is successful. The flow stops if no further consolidation is feasible (the step of 418 does not complete with a successful consolidation.

Note that method 400 is explained and illustrated with pods, but embodiments of the invention are not so limited, and they may be utilized for network function placement for any network where network functions are distributed to different modules and/or locations, e.g., modules could be computing racks, locations could be physically or logically divided locales to host network functions.

Electronic Devices Implementing Embodiments of the Invention

Figure 5:
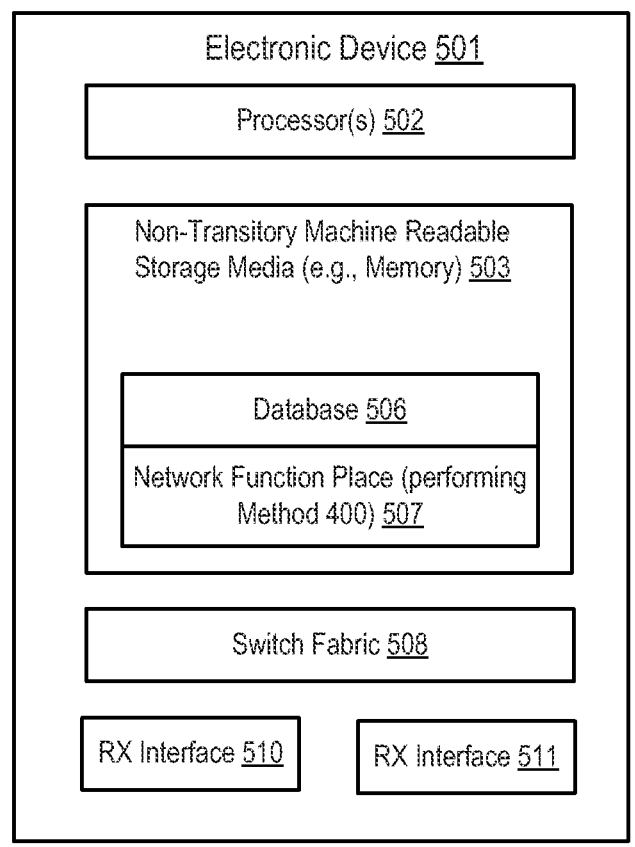
FIG. 5 illustrates an electronic device containing a network function placement module according to one embodiment of the invention.

FIG. 5 illustrates an electronic device containing a network function placement module according to one embodiment of the invention. Electronic device 501 may be a part of operation/business support system (OSS/BSS) 110 of FIG. 1 in one embodiment. Electronic device 501 contains processor or processors 502. It also contains non-transitory machine readable storage media 503, which contains database 506 to store pod selection status in computing network function placement. Network function place module 507 may perform method 400 as discussed herein above.

Electronic device 501 may also contains switch fabric 508 to switch data between transmitting/receiving interfaces 510/511 and processor 502 in computing network function placement.

SDN and NFV Environment Utilizing Embodiment of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6A:
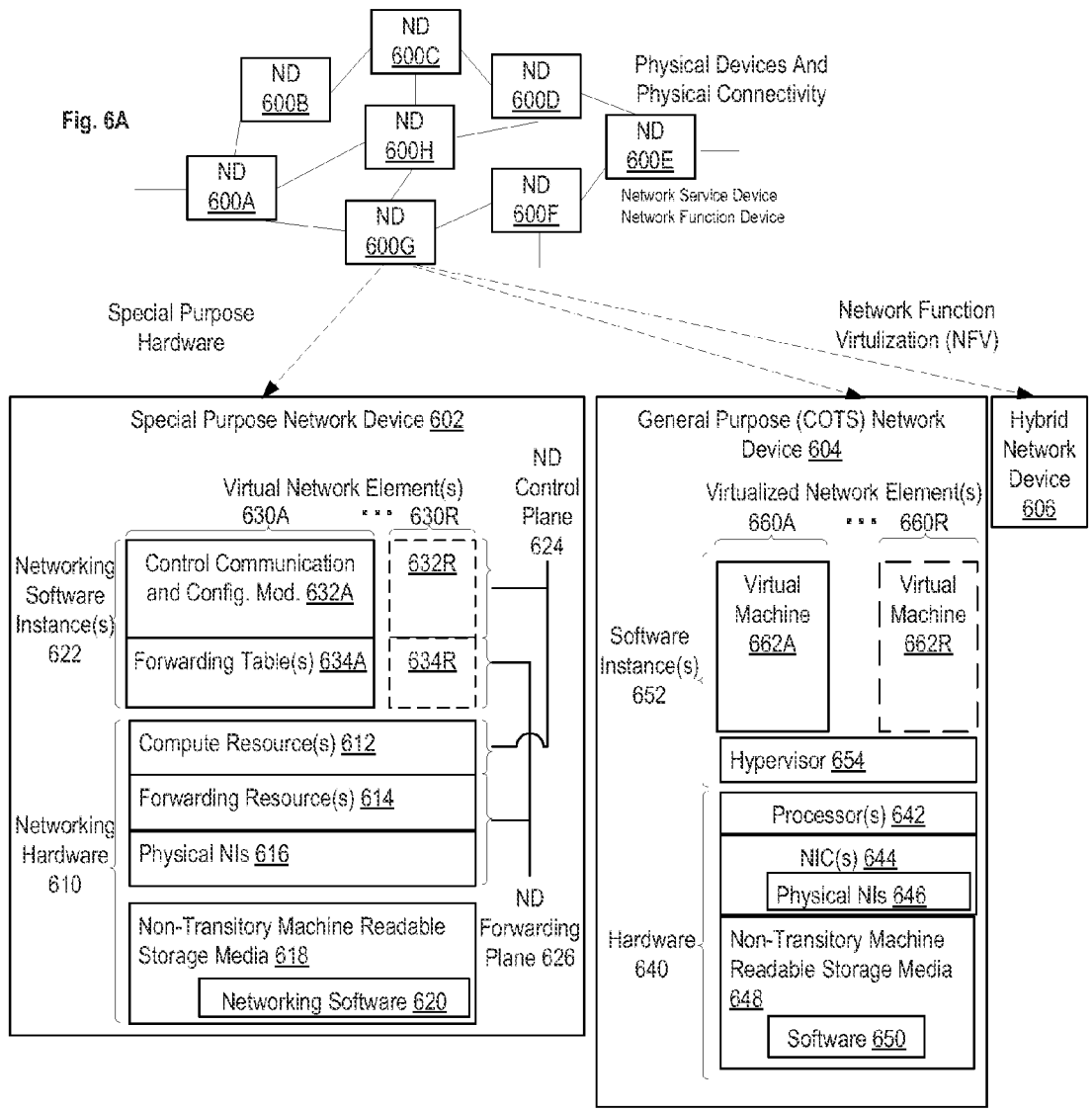
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
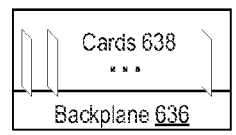
FIG. 6B illustrates an exemplary way to implement the special-purpose network device 602 according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612; in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol).

The network intelligence is centralized in the centralized control plane 676 executing on electronic devices that are typically separate from the NDs. For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. One of the application is network function placement module 115. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
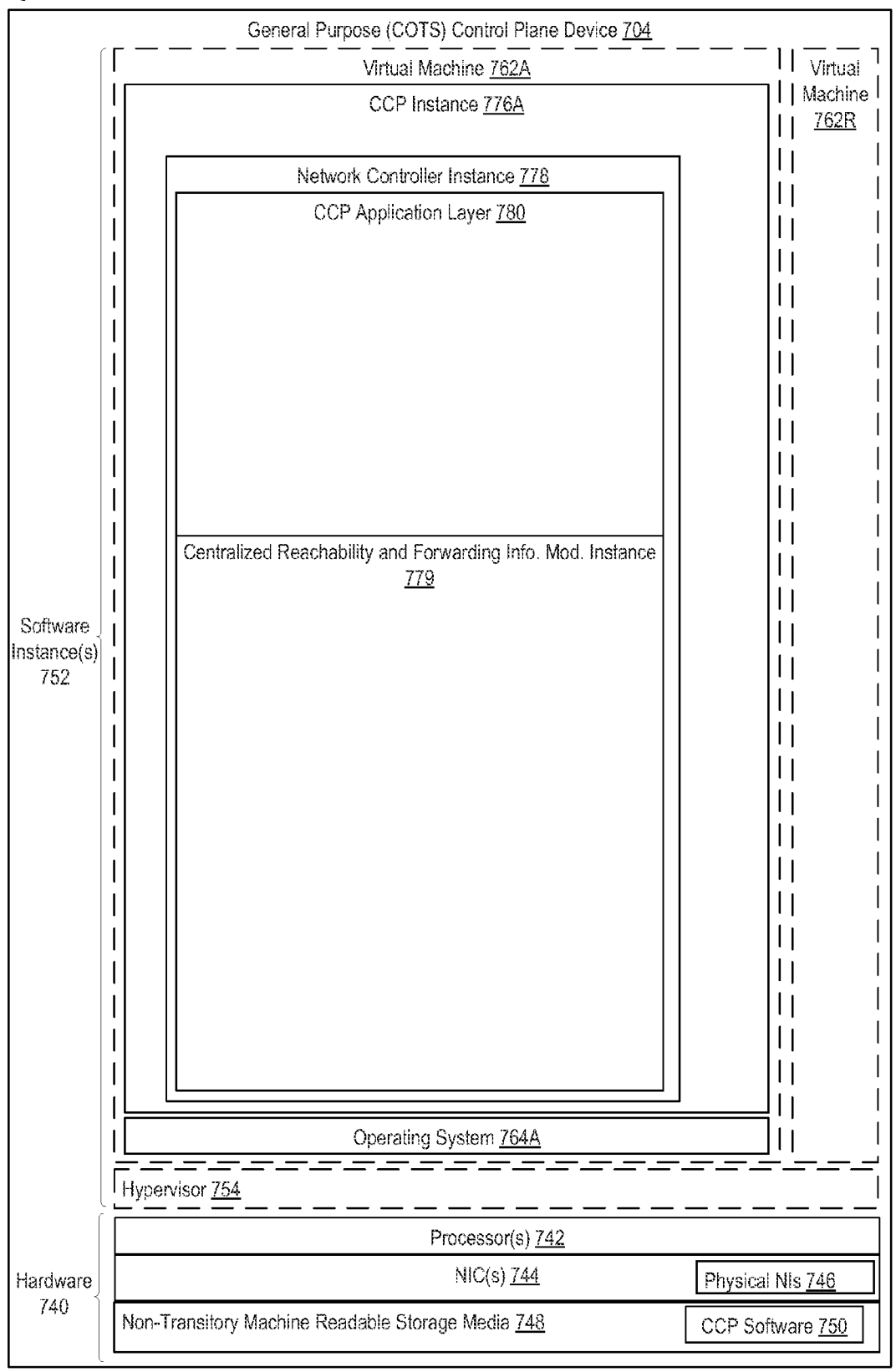
FIG. 7 illustrates a general purpose control plane device 704 including hardware 740 comprising a set of one or more processor(s) 742 (which are often Commercial off-the-shelf (COTS) processors) and network interface controller(s) 744 (NICs; also known as network interface cards) (which include physical NIs 746), as well as non-transitory machine readable storage media 748 having stored therein centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 678 to the operating system 764A and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an electronic device coupled to a network, wherein traffic of the network is routed as a set of traffic flows, wherein each traffic flow is operated on by a chain of network functions, wherein each network function is to be performed by software running on a server, wherein each server resides at a pod, wherein each pod is a hardware unit coupled to the network, the method comprising:
assigning the network functions of each traffic flow to a respective pod or pods, wherein the assigning includes for each traffic flow:
initiating a pod list, wherein the pod list contains no pod initially and wherein selected pods are added to the pod list to provide resources for the network functions;
sorting network functions within a corresponding chain of the traffic flow in a descending order by resource demanded, wherein the resource demanded by each network function is predetermined; and
selecting one network function of the traffic flow at a time according to the descending order, and for each selected network function of the traffic flow:
sorting pods in the pod list in an ascending order by resources available in each pod;
selecting a pod within the pod list for the network function to reside in that has enough resources available for the network function by following the ascending order of the pods in the pod list;
when no pod in the pod list has enough resources available for the network function to reside, adding a pod from a pod pool to the pod list and selecting the added pod for the network function to reside, wherein the added pod is the pod outside of the pod list with the most available resources in the pod pool; and
reassigning one or more network functions assigned to a pod of the selected pods with the least resources consumed into a pod of the selected pods with the most available resources to reduce a total number of selected pods, when the pod with the most available resources has sufficient resources to accommodate consumed resources of the pod with the least resources consumed; and
causing the placement of the network functions in the selected pods.

2. The method of claim 1, wherein the resource demanded by each network function is a bandwidth consumed by the network function.

3. The method of claim 1, wherein the resource demanded by each network function is a computing power consumed by the network function.

4. The method of claim 1, wherein the resource demanded by each network function is at least one of a data storage space and a memory space consumed by the network function.

5. The method of claim 1, wherein the pod pool is a subset of a set of pods coupled to the network, and wherein the pod pool excludes some pods determined not suitable for hosting a network function.

6. The method of claim 1, wherein at least one traffic flow arriving at a pod is from an optical switching device of an optical network.

7. The method of claim 1, wherein the network follows a software-defined network (SDN) architecture and is controlled by an SDN controller, and wherein the electronic device is an application server that interacts with the SDN controller.

8. An electronic devices for a network, wherein traffic of the network is routed as a set of traffic flows, wherein each traffic flow is operated on by a chain of network functions, wherein each network function is to be performed by software running on a server, wherein each server resides at a pod, wherein each pod is a hardware unit coupled to the network, the electronic device comprising:
a processor and non-transitory machine-readable storage medium containing instructions, which when executed by the processor, cause the electronic device to,
assign the network functions of each traffic flow to a respective pod or pods, by performing operations to:
for each traffic flow:
initiate a pod list, wherein the pod list contains no pod initially and wherein selected pods are added to the pod list to provide for the network functions;
sort network functions within a corresponding chain of the traffic flow in a descending order by resource demanded, wherein the resource demanded by each network function is predetermined; and
select one network function of the traffic flow at a time according to the descending order, and for each selected network function of the traffic flow:
sort pods in the pod list in an ascending order by resources available in each pod;
select a pod within the pod list for the network function to reside in that has enough resources available for the network function by following the ascending order of the pods in the pod list;
when no pod in the pod list has enough resources available for the network function to reside, add a pod from a pod pool to the pod list and select the added pod for the network function to reside, wherein the added pod is the pod outside of the pod list with the most available resources in the pod pool; and
reassign one or more network functions assigned to a pod of the selected pods with the least resources consumed into a pod of the selected pods with the most available resources to reduce a total number of selected pods, when the pod with the most available resources has sufficient resources to accommodate consumed resources of the pod with the least resources consumed; and
cause the placement of the network functions in the selected pods.

9. The electronic device of claim 8, wherein the resource demanded by each network function is a bandwidth consumed by the network function.

10. The electronic device of claim 8, wherein the resource demanded by each network function is a computing power consumed by the network function.

11. The electronic device of claim 8, wherein the resource demanded by each network function is at least one of a data storage space and a memory space consumed by the network function.

12. The electronic device of claim 8, wherein at least one traffic flow arriving at a pod is from an optical switching device of an optical network.

13. The electronic device of claim 8, wherein the network follows a software-defined network (SDN) architecture and is controlled by an SDN controller, and wherein the electronic device is an application server that interacts with the SDN controller of the SDN.

14. A non-transitory machine-readable medium having instructions stored therein, which when executed by a processor, cause the processor to perform operations at an electronic device coupled to a network, wherein traffic of the network is routed as a set of traffic flows, wherein each traffic flow is operated on by a chain of network functions, wherein each network function is to be performed by software running on a server, wherein each server resides at a pod, wherein each pod is a hardware unit coupled to the network, the operations comprising:
assigning the network functions of each traffic flow to a respective pod or pods, wherein the assigning includes for each traffic flow;
initiating a pod list, wherein the pod list contains no pod initially and wherein selected pods are added to the pod list to provide resources for the network functions;
sorting network functions within a corresponding chain of the traffic flow in a descending order by resource demanded, wherein the resource demanded by each network function is predetermined; and
selecting one network function of the traffic flow at a time according to the descending order and for each selected network function of the traffic flow:
sorting pods in the pod list in an ascending order by resources available in each pod;
selecting a pod within the pod list for the network function to reside in that has enough resources available for the network function by following the ascending order of the pods in the pod list;
when no pod in the pod list has enough resources available for the network function to reside, adding a pod from a pod pool of the network to the pod list and selecting the added pod for the network function to reside, wherein the added pod is the pod outside of the pod list with the most available resources in the pod pool; and
reassigning one or more network functions assigned to a pod of the selected pods with the least resources consumed into a pod of the selected pods with the most available resources to reduce a total number of selected pods, when the pod with the most available resources has sufficient resources to accommodate consumed resources of the pod with the least resources consumed; and
causing the placement of the network functions in the selected pods.

15. The non-transitory machine-readable medium of claim 14, wherein the resource demanded by each network function is a bandwidth consumed by the network function.

16. The non-transitory machine-readable medium of claim 14, wherein the resource demanded by each network function is a computing power consumed by the network function.

17. The non-transitory machine-readable medium of claim 14, wherein the resource demanded by each network function is at least one of a storage space and a memory space consumed by the network function.

18. The non-transitory machine-readable medium of claim 14, wherein at least one traffic flow arriving at a pod is from an optical switching device of an optical network.

* * * * *